United States Patent Office 3,642,989
Patented Feb. 15, 1972

3,642,989
NEMATOCIDAL PREPARATIONS CONTAINING PHOSPHONIUM COMPOUNDS AS THE INGREDIENT
Henry Martin, Basel, Ernst Beriger, Allschwil, and Kurt Moser, Basel, Switzerland, assignors to Ciba Limited, Basel, Switzerland
No Drawing. Filed June 16, 1967, Ser. No. 646,450
Claims priority, application Switzerland, June 22, 1966, 9,056/66
Int. Cl. A01n 9/36
U.S. Cl. 424—211  6 Claims

ABSTRACT OF THE DISCLOSURE

The present invention relates to a pesticidal preparation, especially a nematocidal preparation, which comprises as active substance, a compound of the formula

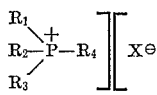

and, if desired, a di-, tri- or poly-halogen adduct thereof, in which formula $R_1$, $R_2$ and $R_3$ are identical or different and each represents an aliphatic, araliphatic, aromatic or heterocyclic group, $R_4$ represents an unsubstituted or substituted aliphatic, araliphatic, aromatic or heterocyclic group and $X^-$ stands for an anion, if desired, together with a suitable carrier.

---

The present invention provides a pesticidal preparation, especially a nematocidal preparation, which comprises an active ingredient of the formula

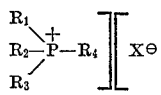  I as well as its di-, tri- and poly-halides, especially the chlorides, bromides and iodides—insofar as they can be formed at all—in which formula $R_1$, $R_2$ and $R_3$ are identical or different aliphatic, araliphatic, aromatic or heterocyclic groups, and $R_4$ represents an unsubstituted or substituted aliphatic, araliphatic, aromatic or heterocyclic group and $X^-$ stands for an anion, if desired, together with a suitable carrier.

As mentioned above, $R_1$, $R_2$ and $R_3$ may be of an aliphatic nature; they may be unsaturated or saturated and may each represent, for example, a methyl, ethyl, propyl, butyl, allyl, propionyl or butinyl group. $R_1$, $R_2$ and $R_3$ may also be substituted, for example by halogen atoms, cyano, nitro, carbalkoxy or carboxamido groups, or they may be interrupted by one or more oxygen or sulphur atoms. $R_1$, $R_2$ and $R_3$ may also be of an araliphatic nature and may each represent, for example, a benzyl, phenylethyl, halogenated benzyl group or a phenylethyl group, or they may consist of aromatic groups, preferably phenyl groups; these phenyl groups may be unsubstituted or contain a variety of substituents, for example halogen atoms, trifluoromethyl, cyano, nitro, thiocyano, alkyl, alkoxy or alkylthio groups.

$R_4$ may be of an aliphatic nature and may represent, for example, a methyl, ethyl, propyl, butyl, allyl, propinyl, butinyl or chlorallyl group; it may be interrupted by one or more oxygen or sulphur atoms, it may also contain substituents, for example halogen atoms, cyano groups, carboxamido groups, N - substituted carboxamido groups, for example N,N - dimethyl-, N,N - diethyl-, N,N - diallyl-, N - aryl-, N - halogenaryl or N - polyhalogenarylcarboxamido groups.

$R_4$ may further contain acetal, thioacetal, ketal or thioketal groups, and these groups may be linear or cyclic, that is to say that they may be derived from mono- or dihydroxy- or mono- or dithioalkanes.

$R_4$ may further contain carbonyl groups, that is to say that the active ingredient of the Formula I may be derived from a trisubstituted phosphine and a halogenoketone which may contain further halogen atoms, for example fluorine atoms.

$R_4$ may further contain carboxyl groups; in such a case, depending on the steric conditions, betaine-like compounds are formed. $R_4$ may also contain carbalkoxy group, in which case the alkyl group, esterified with the carboxyl group, may also contain halogen atoms. $R_4$ may also contain N-alkyl groups, N-dialkyl groups, pyrrolidino, piperidino, N'-alkylpiperazino or N'-alkyl-homopiperazino groups.

If $R_4$ is of an araliphatic nature, it may represent a benzyl, benzhydryl or trityl group, and the aromatic portion may be substituted by a wide variety of groups, as defined above for $R_1$, $R_2$ and $R_3$.

The aliphatic portion of the group $R_4$ may contain carbonyl groups; accordingly, a phosphonium compound thus constituted may be derived from a halogenacylphenone, for example ω-halogenoacetophenone, desylchloride and a trisubstituted phosphine.

A special type of phosphonium compound is distinguished by the fact that $R_4$ represents an aliphatic group containing a heterocycle.

Such compounds are accessible, for example, by reacting trisubstituted phosphines with halogenalkylimidazolines, halogenalkyloxazolidines, halogenalkylphthalimides, halogenalkylbenzimidazolones or halogenalkylbenzazimides.

The term "araliphatic group" is also used herein to include, for example, the thiophenylmethyl group, the α-, β- or γ-pyridylmethyl group and the furfuryl group.

An outstanding group of compounds that display a strong action against phytoparasitary nematodes corresponds to the general formula

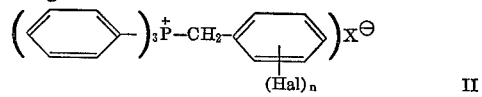  II in which $n=0$, 1 or 2 and Hal is preferably a chlorine atom and $X^-$ a halogenation. The group $R_4$ need not have exclusively an aliphatic, araliphatic or aromatic character and may also be of acylic nature, consisting for example of an aliphatic, aromatic or araliphatic acyl group.

Another group of valuable active compounds corresponds to the general formula

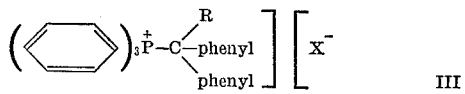  III in which R represents a hydrogen atom or a phenyl group. The phenyl groups may contain halogen atoms, for example chlorine or bromine atoms, in various positions, and the individual phenyl nuclei need not carry identical substituents: One of them may contain chlorine in the ortho- and/or para-position, whereas another may be unhalogenated or contain a chlorine atom in the meta-position.

Halogenation in the 3,4-position also gives rise to potent pesticides, as does halogenation in the 2,4,5-position.

Potent pesticides are also obtained by introducing acyl groups in the phosphine molecule, for example by manufacturing compounds of the formula

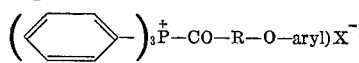

in which R represents a short-chain alkene group and aryl represents a phenyl group which may be halogenated and/ or alkoxylated or alkylated.

The anion X⁻ may consist of any desired residue of an inorganic or organic acid. It goes without saying that X⁻ may also be the hydroxyl ion but, as generally the hydroxides do not crystallize very well, other anions are preferred.

Since the phosphonium compounds used in the present invention, are obtained as halides, owing to the manner of their manufacture, it is preferable to use them in the form in which they are obtained. It is, of course, also possible to exchange ions, for example halogen ions for acetate ions by using silver acetate.

Many of the phosphonium compounds of the general formula I add on chlorine, bromine or iodine and form relatively stable di-, tri- and tetrahalides. Adducts of this kind are explicitly included in this invention.

For combating nematodes, the new active substances of the Formula I may be used in solid form, for example as finely powdered casting agents or as granulates, also in liquid form as emulsions, suspensions or solutions without additives. The form of the preparation is chosen according to the intended manner of application, which in turn depends on the type of nematodes to be combated, on the plant culture to be protected, on the climate and the soil conditions as well as on the working conditions. In most cases, it is advantageous to distribute the active substance evenly over a soil layer of about 15 to 25 cm. depth, the amount of active substance applied being in general from 20 to 100 kg. per hectare. It is, however, also possible to restrict the application to certain areas, for example seedling holes or seed furrows, and under certain conditions this may afford an adequate protection, and of course means that the consumption of active substance is reduced.

Dusting agents can be prepared by mixing or joint grinding of the active ingredient with a solid, pulverulent, water-insoluble or sparingly water-soluble vehicle, for example talcum, diatomaceous earth (kieselguhr), kaolines, bentonites, calcium carbonate, boric acid or tricalcium phosphate. It is also possible to deposit the active substance on the vehicle by means of a volatile solvent. For the manufacture of casting agents, there may be used vehicles which as such are of course grain and/or specifically rather heavy, for example coarsely ground limestone, sand and loess, or else granulated mixtures of the active substance with as such fine-grain, if desired porous, vehicles may be used.

Furthermore, casting agents may contain as vehicles in the form of coarse grains, or if desired in granular form, solid substances that are readily soluble in water or citrate solutions, for example fertilizers such as digested calcium phosphates or other calcium, potassium or ammonium salts, loess, phosphates or nitrates.

Emulsions prepared according to this invention may be used in unplanted fields and, by virtue of their penetrating power, also in existing plant cultures. They may be prepared, for example, by dissolving the active substance in an organic solvent, for example xylene, and this solution is then emulsified in water containing a surface-active substance. For the use of emulsions it is generally advantageous, in actual practice, first to manufacture a concentrate by combining the active substance with an inert organic solvent and/or surface-active substances (emulsifiers); such concentrates themselves constitute single-phase or poly-phase systems which can be made into emulsions, ready for use, by adding water. Suitable surface-active substances (emulsifiers) are cationic substances, for example quaternary ammonium salts, anionic substances for example salts of aliphatic, long-chain sulphuric acid monoesters, long-chain alkoxyacetic acids and aliphatic-aromatic sulphonic acids, and non-ionic surface-active substances, for example polyethyleneglycol ethers of fatty alcohols or of dialkylphenols and polycondensation products of ethylene oxide and amphoteric surface-active substances. As suitable solvents for the preparation of emulsion concentrates, there may be mentioned, for example, cyclic hydrocarbons such as benzene, toluene, xylene, ketones, alcohols and further solvents, for example ethyl acetate, dioxane, acetoneglycerol or diacetone alcohol.

Suspensions are prepared by directly suspending the moist active substance in water which may contain a surface-active substance, or by suspending wettable powders obtained by mixing solid active substances with surface-active substances or with solid pulverulant vehicles and surface-active substances.

Solvents suitable for the active substances according to this invention are inter alia, for example, halogenated hydrocarbons having a nematocidal effect of their own, for example 1,2-dibromo-3-chloropropene, dichlorobutene or mixtures of dichloropropane and dichloropropene whose spontaneous nematocidal effect is improved in a valuable manner by the sustained activity of the active substances of this invention.

The active substances of this invention may be used for combating a wide variety of nematodes, for example *Meloidogyne arenaria,* Pratylenchus sp., *Ditylenchus dipsaci* and the like. In the concentrations suitable for actual use, the compounds are not phytotoxic,, so that there is no risk of any damage to the growing plants. If desired, the biological activity of the agents of this invention can be enhanced by the addition of fungicidal, herbicidal or insecticidal or further nematocidal active substances.

The active substances of the invention are advantageous in comparison with the hitherto used nematocides in that their activity is sustained over a prolonged period of time and that no phytotoxicity occurs.

In the past, the only compounds that have found widespread acceptance for combating nematodes are those which either act in the gaseous phase, for example 1,2-dibromo-2-chloropropene (tradename DD) or those which decompose rapidly in the soil, for example the sodium salt of monomethyl-dithiocarbamic acid or 3,5-dimethyltetrahydro-1,3,5-thiadiazine-2-thione. The product VC 13–Nemacid, whose potency is known, is costly in its manufacture. It is clear that this made the killing of worms in the soil an expensive undertaking.

In contrast thereto, the active ingredients of the Formula I act reliably and rapidly and their manufacture is simple and inexpensive.

The active substances of the Formula I are obtained when a phosphine of the formula

is reacted with a compound of the formula $R_4X$. In these formulae, $R_1$ to $R_4$ have the meanings given above and X represents a hydroxyl group esterified with a strong acid. If desired, the anion X may be exchanged in the known manner for another anion and/or the phosphonium compound obtained may be converted into an iodine adduct.

The following examples illustrate the invention:

EXAMPLE 1

A mixture of 52.4 parts of triphenylphosphine, 55.8 parts of triphenylchloromethane and 200 parts by volume of acetonitrile is refluxed for 5 hours. Then the solvent is expelled under vacuum at 50° C., to leave, as residue, 122 parts of a yellow resin which crystallizes. After washing with acetone, the crystals melt at a temperature within the range of from 245 to 247° C. The product obtained in this manner is the pure compound of the formula

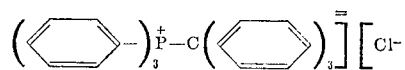

(Compound No. 1). In an identical manner, the following compounds may be prepared:

| Compound number | Formula | M.P., degree |
|---|---|---|
| 2 | $(C_6H_5)_3\overset{Cl}{P}-CH_2-C_6H_5$ | 335 |
| 3 | $(C_6H_5)_3\overset{Cl}{P}-CH_2-C_6H_4-Cl$ | 284 |
| 4 | $(C_6H_5)_3\overset{Cl}{P}-CH_2-C_6H_4(o\text{-}Cl)$ | 240 |
| 5 | $(C_6H_5)_3\overset{Cl}{P}-C_4H_9$ | 223 |
| 6 | $(C_6H_5)_3\overset{Br}{P}-CH_2CH=CH_2$ | 219 |
| 7 | $(C_6H_5)_3\overset{Cl}{P}-CH_2CN$ | 275 |
| 8 | $(C_6H_5)_3\overset{Cl}{P}-CH_2CONH_2$ | 206 [1] |
| 9 | $(C_6H_5)_3\overset{Cl}{P}-CH_2CON(CH_2CH=CH_2)_2$ | 165 |
| 10 | $(C_6H_5)_3\overset{Cl}{P}-CH_2CONHC_3H_6-OCH_3$ | 235 |
| 11 | $(C_6H_5)_3\overset{Cl}{P}-COCH_2-O-C_6H_3Cl_2$ | ---- |
| 12 | $(C_6H_5)_3\overset{Cl}{P}-CH_2CONH-C_6H_3Cl_2$ | ---- |
| 13 | $(C_6H_5)_3\overset{Cl}{P}-CH_2-C_6H_3Cl_2$ | ca. 306 |
| 14 | $(C_4H_9)_3\overset{Cl}{P}-CH_2-C_6H_3Cl_2$ | 125 |
| 15 | $(C_4H_9)_3\overset{Cl}{P}-CH_2CN$ | (2) |
| 16 | $(C_4H_9)_2\overset{Cl}{P}-CH_2CH_2Cl$ | (2) |
| 17 | $(C_4H_9)_3\overset{Cl}{P}-C(C_6H_5)_3$ | 125 |
| 18 | $(C_6H_5)_3\overset{Cl}{P}^+-CH(C_6H_5)_2$ | 270–271 |
| 19 | $(C_6H_5)_3\overset{Cl}{P}-CH(C_6H_4Cl)(C_6H_5)$ | 220–223 |
| 20 | $(C_6H_5)_3\overset{Cl}{P}-CH_2-O-C_{18}H_{37}$ | 77–82 |
| 21 | $(C_6H_5)_3\overset{Cl}{P}-CH_2-O-C_{12}H_{25}$ | Waxy |
| 22 | $(C_6H_5)_3\overset{Cl}{P}-CH_2O-C_8H_{17}$ | Waxy |
| 23 | $(C_6H_5)_3\overset{Cl}{P}-CH_2-O-C_{10}H_{21}$ | Waxy |
| 24 | $(C_6H_5)_3\overset{Cl}{P}-CH_2O-CH_2-CH=CH_2$ | 175–178 |
| 25 | $(C_6H_5)_3\overset{Br}{P}-CH_2O-C_{12}H_{25}$ | Waxy |
| 26 | $(C_6H_5)_3\overset{Cl}{P}-CH_2-C_6H_2(OH)(Cl)_2$ | ---- |
| 27 | $(C_6H_5)_3\overset{Cl}{P}-CH_2-C_6Cl_5$ | 278–285 |
| 28 | $(C_6H_5)_3\overset{Cl}{P}-CH_2-N(benzisoxazole)$ | 148–159 |
| 29 | $(C_6H_5)_3\overset{Cl}{P}-CN_2-N(phthalimide)$ | 250–252 |
| 30 | $(C_6H_5)_3\overset{Cl}{P}-CH_2-CH(OC_2H_5)_2$ | 74–76 |
| 31 | $(C_6H_5)_3\overset{Cl}{P}-CH_2-CH_2-CH_2-N(oxazolidinone)$ | 70–72 |
| 32 | $(C_6H_5)_3\overset{Cl}{P}-CH_2-CH_2-N(oxazolidinone)$ | 74–75 |

See footnotes at end of table.

| Compound number | Formula | M.P., degree |
|---|---|---|
| 33 | $(C_6H_5)_3P-CH(Cl)-CO-C_6H_5$ | ......... |
| 34 | $(C_6H_5)_3\overset{Br}{P}-C_2H_4OC_2H_5$ | 182 |
| 35 | $(C_4H_9)_3\overset{Br}{P}-C_2H_4OC_2H_5$ | ca. 182 |
| 36 | $(C_6H_5)_3\overset{Br}{P}-C_2H_4S-C_6H_4-H$ | (³) |
| 37 | $(C_4H_9)_3\overset{Br}{P}-C_2H_4S-C_6H_4-H$ | (⁴) |
| 38 | $(ClCH_2)_3\overset{Cl}{P}-CH_2-C_6H_3(Cl)(Cl)$ | ......... |
| 39 | $(C_6H_5)_3\overset{Cl}{P}-CH_2-C_6H_2(Cl)(Cl)-Cl\cdot Br_2$ | 114 |

¹ Decomposed.  ² Highly hydroscopic crystals.  ³ Colourless resin.  ⁴ Viscid oil.

The compounds Nos. 16 to 39 are new substances, and therefore special protection is claimed for them.

EXAMPLE 2

The phosphonium compounds described above are formulated in the following manner: The phosphonium salt is dissolved in a small amount of acetone containing an emulsifier, for example sodium 2-undecylimidazole-disulphonate, and from this solution the desired dilutions are obtained by addition of aerated water.

EXAMPLE 3

The nematocidal effect was tested as follows: Flasks of 5 litre capacity are filled 2/3 full with very thoroughly washed quartz sand. Then, 1 cc. of the solution to be tested is added, and the flasks are well agitated to ensure intimate mixing of their contents. In each flask, there are then introduced 100 nematodes (*Pangrellus redivivus*), the flasks are closed, once more agitated and then left by themselves for 48 hours. Then the mortality of the nematodes is counted. The test for each concentration was repeated four times.

The reference substance used was a mixture of dichloropropane/dichloropropane (D.D.).

The following results were obtained:

| Compound No.: | Mortality in percent at 25 parts per million |
|---|---|
| 2 | 98 |
| 3 | 95 |
| 4 | 91 |
| 5 | 90 |
| 6 | 93 |
| 8 | 74 |
| 9 | 95 |
| 11 | 80 |
| 13 | 96 |

EXAMPLE 4

The quantity of triphenyl-benzylphosphonium chloride required to achieve the desired concentration of active substance is intimately mixed with 20 cc. of washed, dry sand and this mixture is mixed with 1 litre of natural soil infested with *Meloidogyne arenaria*. The whole is left by itself for 6 to 7 days, then the soil is distributed in 3 pots and in each pot 4 tomato seedlings are planted. After 9 weeks, the small knots formed on the roots of the plants are counted and the plant is weighed. The counting of the knots revealed a more than 90% effect for a concentration of 50 parts per million of active substance, and a substantially 100% effect for 75 parts per million.

EXAMPLE 5

20 parts of active substance No. 9 and 80 parts of talcum are ground as finely as possible in a ball mill. The resulting mixture is used as a dusting agent.

EXAMPLE 6

20 parts of active substance No. 13 are dissolved in a mixture of 48 parts of diacetone alcohol, 16 parts of xylene and 16 parts of an anhydrous high-molecular condensation product from ethylene oxide and higher fatty acids. This concentrate can be diluted with water to an emulsion of any desired concentration.

EXAMPLE 7

80 parts of active substance are mixed with 2 to 4 parts of a wetting agent (for example the sodium salt of an alkylpolyglycol ether monosulphate), 1 to 3 parts of a protective colloid (for example sulphite waste liquor) and 15 parts of an inert, solid vehicle (for example kaolin, bentonite, chalk or kieselguhr) and the whole is then finely ground in a suitable mill. The resulting wettable powder can be pasted with water to form very stable suspensions.

EXAMPLE 8

5 parts of active substance No. 11 are mixed with 95 parts of calcium carbonate (ground limestone) and ground. The resulting product may be used as a casting agent.

EXAMPLE 9

5 parts of active substance No. 11 are mixed with 95 parts of a pulverulent vehicle, for example sand or calcium carbonate, and moistened with 1 to 5 parts of water or isoproponal. The mixture is then granulated.

Before granulating it, the above mixture—or a mixture containing more of the active substance, for example consisting of 10 parts of active substance and 90 parts of calcium carbonate—may be admixed with a multiple quantity, for example 100 to 900 parts of a fertilizer which may be water-soluble, for example ammonium sulphate.

EXAMPLE 10

A solution is obtained by mixing 50 parts of the compound No. 9, 45 parts of xylene, 2.5 parts of a condensation product of ethylene oxide with an alkylphenol and 2.5 parts of a mixture of the sodium salt of dodecylhydroxyethyl sulphuric acid and dodecylethoxy-ethoxy sulphuric acid. This solution can be emulsified in water.

EXAMPLE 11

The compound No. 13 was tested for its nematocidal effect against *Maloidogyne* sp., *Pratylenchus* sp. and other parasitary nematodes by casting it in a field test. The plants tested were tomatoes, bush beans and melons. The effect was determined by a soil analysis carried out about 4 weeks after the treatment, and by weighing the crop.

The results of the soil analysis are summarized in the following table, which gives the number of nematodes killed in percent. The tests were carried out with 20 cc. of soil taken from a soil specimen of 500 cc.

| | Active substance in g./m.³, cast and worked into the soil to a depth of 20 cm. | | |
|---|---|---|---|
| | 105 | 10 | 20 |
| Meloidogyne sp | 85 | 100 | 100 |
| Pratylenchus sp | 97 | 100 | 100 |
| Other parasitary nematodes | 99 | 100 | 97 |

The increase in crop was for tomatoes, beans and melons 60 to 100% compared with the untreated control plants.

EXAMPLE 12

The compound No. 13 was tested in the form of a 10% aqueous solution by the method described in Example 11. The active substance was applied by impregnating the soil on which the culture plants grew. When 20 g./m.² were applied, Meloidogyne sp., Pratylenchus sp. and other parasitary nematodes were killed off to an extent of 100%.

What we claim is:

1. A method of controlling nematodes on crops, which comprises applying to said nematodes a nematocidally effective amount of a phosphonium compound of the formula

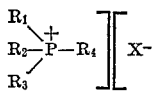

wherein $R_1$, $R_2$ and $R_3$ are phenyl, $R_4$ is allyl, methylcarboxamido, N,N-diallylmethylcarboxamido, benzyl, monochlorobenzyl or dichlorobenzyl, and X is bromide or chloride.

2. A method as claimed in claim 1, in which the active ingredient is a compound of the formula

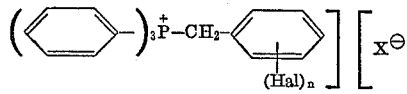

in which $n=0$, 1 or 2, Hal is a chlorine atom and $X^-$ a bromide or chloride ion.

3. A method as claimed in claim 1, the compound being of the formula

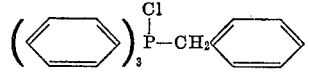

4. A method as claimed in claim 1, the compound being of the formula

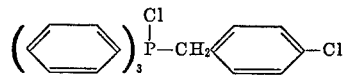

5. A method as claimed in claim 1, the compound being of the formula

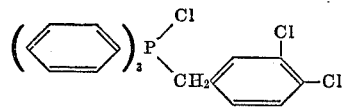

6. A method as claimed in claim 1, the compound being of the formula

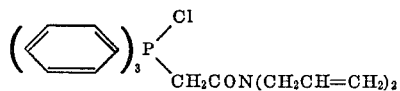

References Cited

UNITED STATES PATENTS 3,281,365  10/1966  MOEDRITZER _____ 424—198

STANLEY J. FRIEDMAN, Primary Examiner

D. M. STEPHENS, Assistant Examiner

U.S. Cl. X.R.

424—198, 219, 221